United States Patent

[11] 3,603,103

| [72] | Inventors | Stuart Richmond<br>Sheffield;<br>David W. Exley, Barnsley, both of, England |
|---|---|---|
| [21] | Appl. No. | 796,678 |
| [22] | Filed | Feb. 5, 1969 |
| [45] | Patented | Sept. 7, 1971 |
| [73] | Assignee | Newton, Chambers & Company Limited<br>Sheffield, England |
| [32] | Priority | Feb. 7, 1968, Apr. 23, 1968 |
| [33] | | Great Britain |
| [31] | | 6129/68 and 19184/68 |

[54] CONTINUOUS CRYSTALLISATION PLANT
10 Claims, 4 Drawing Figs.

[52] U.S. Cl. .................................................. 62/124,
62/58, 165/120
[51] Int. Cl. .............................................. B01d 9/04
[50] Field of Search ........................................ 62/354,
123, 124, 58; 165/120

[56] References Cited
UNITED STATES PATENTS

| 2,617,273 | 11/1952 | Findlay ........................ | 165/65 X |
| 2,659,761 | 11/1953 | Frevel et al. ................. | 62/124 X |
| 2,679,539 | 5/1954 | McKay ........................ | 62/124 X |

OTHER REFERENCES
Industrial & Engineering Chemistry Vol. 60 No. 11 Nov. 1968 Pages 6 & 7

*Primary Examiner*—William E. Wayner
*Attorney*—Sughrue, Rothwell, Mion, Zinn & Macpeak ABSTRACT: The conventional Schildeknecht crystallizer has certain disadvantages which may be reduced or overcome if the standard helical conveyor is replaced wholly or in part by a screw conveyor. Furthermore it has been found essential that the finish on the conveyor of a Schildeknecht crystallizer, whether helix or screw or a combination of the two, should be CLA 63 or better for efficient crystal transport.

CONTINUOUS CRYSTALLISATION PLANT

The separation of two or more liquids by fractional distillation is well known. The separation depends on liquid-vapor equilibria in the distillation column and is, in effect, a countercurrent method which operates continuously.

Until recently there has been no method whereby solid-liquid separation could be carried out continuously in one apparatus. Crystallization has usually had to be a batch process. With the introduction of zone melting, it became possible to crystallize solids from liquids more efficiently and achieve semicontinuous separation. Continuous methods for fractional crystallization have been described, but those described do not have all the advantage of countercurrent processes.

A method for countercurrent crystallization using the principles of column distillation was described by Schildeknecht and Vetter in Angew Chem., Sept. 1961, 73. Pages 612 to 615. The method described was concerned with the separation of a mixture of two substances, which were miscible at every concentration in both the melted and crystalline states, the feedstock of the two substances in liquid form being introduced into roughly the center of a column, one end of which was cooled and the other end of which was heated. As crystals formed in the cooler part of the column, they were transported along the column to the hotter end of the column. In the course of this passage, the crystals were washed by liquid components of the feed. Crystals of the one substance arriving at the hot end o the column were melted and withdrawn as a first product, and the second substance arriving at the other end of the column was withdrawn as a second product.

Schildeknecht et al. described in their article various forms of apparatus in which they tried to effect countercurrent crystallization. Eventually they developed an apparatus formed essentially of an outer shell surrounding a fixed inner core, together with a spiral type of conveyor moving between the inner core and the outer shell. Such a basic apparatus will now be described with reference to FIG. 1 of the accompanying drawings, and with specific reference to the separation of benzene from a feed of benzene and nonaromatic solvents, although the apparatus may be used to separate any crystallizable material from its solution.

In the accompanying drawings,

FIG. 3 shows a helical crystallizer in which the conveyor mechanism is made up of a screw and a helix connected together.

Figure 1:
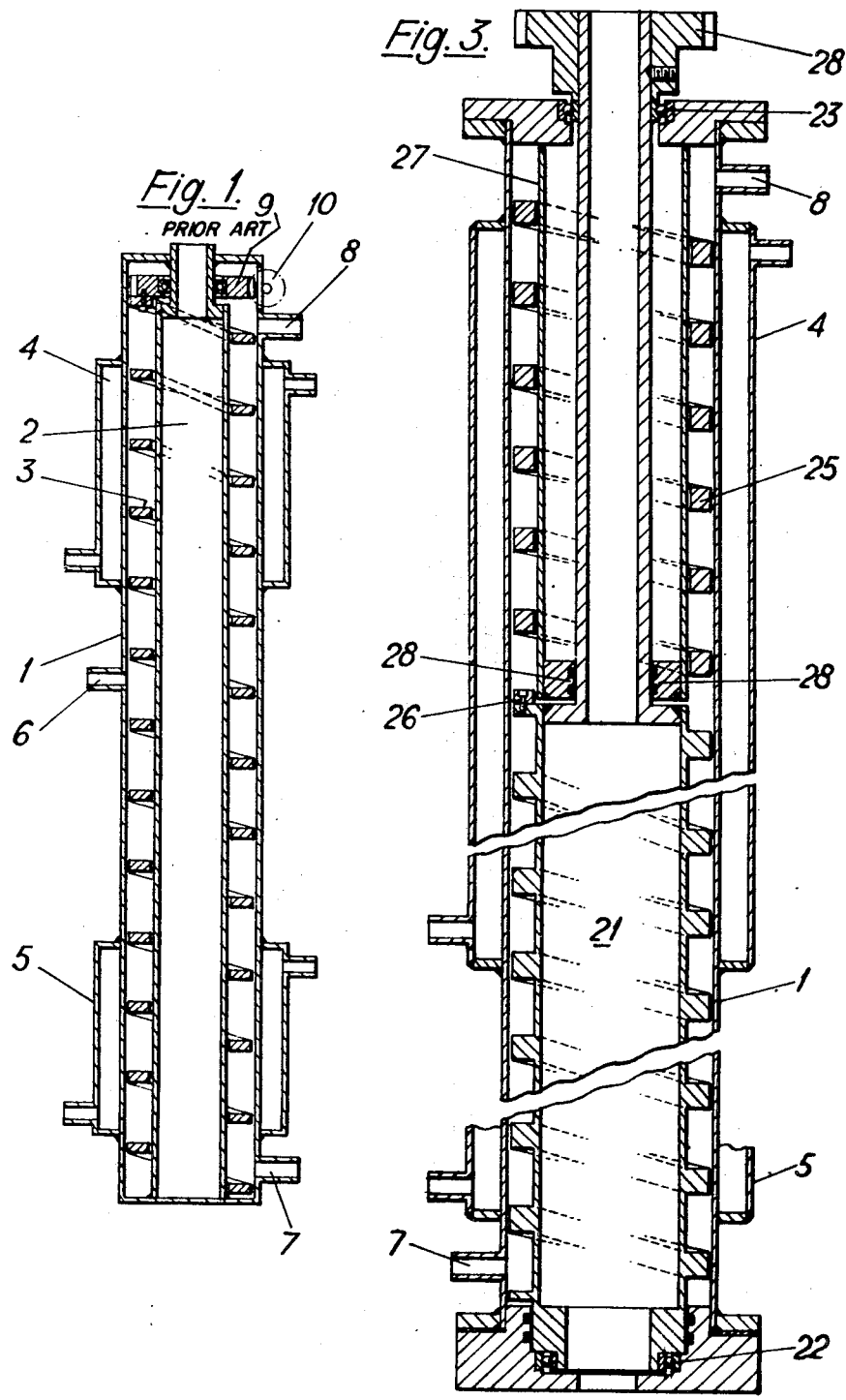

A column 1 is in the form of an outer cylindrical shell surrounding an inner core 2. The annular space between the shell and the core contains a helical conveyor 3; this conveyor is a close fit between the shell and the core, and is rotated by a pinion and worm drive 9 and 10 at the top. There is no bearing for the conveyor at the bottom. A cooler 4 surrounds the top of the column, and a heater 5 surrounds the bottom of the column.

The feed of benzene and nonaromatics is introduced at or about the middle of the column at 6. The effect of the heater is to form a reflux of the feed, driving it to the top of the column where it is cooled so that crystals tend to separate. The conveyor 3 is operated in such a way as to convey the crystals downwards again, and, while they are moving downwards, they are washed by upward flowing feed. When equilibrium is reached, crystals are being delivered to the bottom of the column where they are melted by the heater and withdrawn at 7 as liquid benzene, and nonaromatics are withdrawn from the top of the column at 8.

The success of countercurrent crystallization depends to a large extent on the efficiency with which the crystals are transported in the crystallizer. In the conventional crystallizer the crystals are transported by a helical conveyor between the outer shell and the core, and the helical conveyor must be manufactured to very narrow tolerances for success, the aim being to provide for less than 0.03 inch clearance between the helix and the walls of the annular space between outer shell and core for an 8-inch diameter 6-foot long helix. Apart from the problems which arise in the accurate manufacture of helices, there will necessarily be frictional contact between the helix and the walls bounding the annular space when the helix is rotated, and such frictional contact in practice causes welding of the surfaces and damages both the walls and the helix. We have now found that the difficulties associated with the use of a helix can often be reduced if we replace all or part of the conveyor mechanism formed by central core and helix by a screw conveyor. If desired, the entire central core and helix may be replaced by a screw conveyor, mounted in bearings at both ends of the column, and driven from top or bottom; alternatively a helix with a central core may be used in the cooling zone of the column, and a screw in the rest of the column, the two parts being linked together so that the conveyor mechanism is in effect continuous along the length of the column. The helix and the screw need not be connected, however, and may then be mounted so that they may be driven at different speeds to suit the conditions. Furthermore, we have found that the efficiency of transport of crystals and mother liquor in a continuous crystallizer is very significantly affected by the surface finish of the conveyor mechanism in the column, whether this mechanism is a helix around a central core, a screw conveyor or a combination of the two.

This invention is therefore also based on an appreciation that the better the finish on the conveyor mechanism the more efficient is the transport; our experiments have shown that a finish of C.L.A. 63 or better is necessary for adequate transport.

The machined finish on the conveyor mechanism is defined in terms of C.L.A. (Center Line Average Height) measured according to British Standard No. 1134 (1961 publication). The United States Standard corresponding to this British Standard is ASA B. .46.1. The surface finish is defined in this American Standard by reference to the arithmetical average deviation of the surface from a mean line. The deviation is measured in micro inches and since the deviation from the mean line known in the American Standard as A.A. is exactly the same thing as the center line average height, which is also measured in microinches, the A.A. number is the same as the C.L.A. number.

Conveyor mechanisms are conveniently made of mild steel, and may be used in the as-machined form. Certain applications, for example the processing of foodstuffs, may require that the conveyor mechanism be of stainless steel, and here again the mechanism may be used in the as-machined form. In many cases, however, corrosion problems are likely to arise, and we therefore prefer that the conveyor mechanism should be chromium plated with, of course, the same requirement as to excellence of surface finish. Since any irregularities in a substrate can be seen in a chromium plating applied to the substrate, it is necessary to machine and polish the conveyor mechanism to the desired finish, that is to C.L.A. or A.A. 63 or better, before applying the chromium plating; preferably the plating is of diachrome plate, an engineering chrome which is abrasion and corrosion-resistant, and this can be applied by normal methods of electrochemical deposition directly onto the metal without any undercoat.

An Example will now be given of the manufacture of a screw conveyor. Such a conveyor, for example a worm 33 inches long and 2 inches in diameter, may be machined from thick-walled mild steel tube, preferably itself formed by boring out solid rod to give a tube having good uniform machining characteristics; extruded tube is more difficult to machine, though it can be done with care. The desired finish of C.L.A.

or A.A. 63 or better may be obtained by careful turning, or by less careful turning or vertical end milling followed by grinding. Worms up to 6 feet long and 8 inches in diameter are prepared by these methods, and helices can also be machined from suitable tube.

The conveyor is then degreased, for example in acetone, and given an even matt satinlike finish (known in the art as a "satin polish") by buffing with a fabric buffing wheel to which has been applied the polishing compound sold under the trade mark Sateene. A layer of diachrome plate, nominal thickness 0.001 inch, is then applied, and the conveyor then given a further satin polish. The conveyor is then ready for use.

Another satisfactory way of making a worm is to cast it from a Meehanite iron to tolerances of 0.005 inch, and then machine it to the desired finish, with final chrome plating as before.

The quality of the separation in a helical crystallizer depends directly on the efficiency of the heating and cooling arrangements, and on the washing of the crystals. A number of modifications are possible to the standard arrangement whereby the one end of the column is surrounded by a cooler and the other end is surrounded by a heater jacket. According to a further feature of the invention, heating or cooling devices or both should be installed in the center of the conveyor mechanism opposite to the heating and cooling devices conventionally placed on the outside of the column; if the conveyor mechanism is made up partly by a screw and partly by a helix, then heating and cooling devices as appropriate may be located in the screw and in the central core of the column inside the helix as appropriate, opposite the conventionally placed devices. In this way, considerably better efficiency of heating and cooling will be obtained. A yet further feature is that the flights of the conveyor mechanism should themselves be hollow, and that a suitable heating or cooling medium be circulated through them. Again, if a screw is used in conjunction with a helix, both may be hollow, and the same or a different medium circulated through them. This proposal has advantages in that it is possible to pass a cooling medium through the screw, or through both the screw and the helix, and to use the medium as a heat exchanger for transferring heat along the column. If the column in fact ever blocked up with crystals, it would be possible to melt it out quickly by circulating a hot medium.

In the process of continuous crystallization with a helical crystallizer, the operation of the heating and cooling devices must be nicely balanced to achieve the best results. Clearly if excess coolant is fed to the apparatus, an excess of crystals will be produced relative to the supply of feed liquor, and the apparatus will then tend to become blocked with crystals. One way of avoiding this possibility of blockage, or at least substantially reduces the possibility of it's occurring, is by driving the screw, or both the screw and the helix, electrically, and adjusting the supply of coolant and heating medium to the column in response to the power consumption of the driving motor. Clearly if the column is being operated so that the degree of crystallization is too high, there will be an excess of crystals in the column and the conveyor mechanism will be much stiffer to turn; more power will be required. The supply of coolant is therefore preferably adjusted in inverse relationship to the power required to drive the conveyor mechanism.

The amount of light absorbed by crystals and mother liquor will be different, and hence the amount of light absorbed by the contents of the column is a measure of the degree of crystallization occurring. Another method of controlling the supply of coolant or heating medium to the column makes use of this fact; a sight glass may be inserted across a section of the column, a photoelectric cell used to sense the light transmitted, and the output from the cell used to adjust the supply of coolant or heating medium.

The standard shape of a continuous crystallization column is cylindrical. In certain circumstances, it may be desirable to alter the standard shape somewhat. For example, the column may be cone-shaped, the larger diameter of the cone being at the cooled end of the column. The problem in continuous crystallization is always to remove heat, that is to cool the solutions being crystallized, and the use of a conical column gives more "cold" volume while retaining the geometry of the washing zones lower down. In certain circumstances, it may be possible to use a column which is generally cylindrical in cross section but which is stepped at suitable distances along its length so as to provide the ratios of area for heating and cooling.

The columns described so far have assumed that the crystals were heavier than the mother liquor. Even if the crystals are lighter than the mother liquor, the process still requires that they be transported along the column from the cool end to the hot end, and it may be advantageous to have the heater at the top of the column and the cooler at the bottom, that is the column inverted. In certain circumstances, it may be possible additionally to make use of thermal separation of crystals and mother liquor, and in such cases it may be desirable to operate the column in a position which is sloped to the vertical. The conventional conveyor mechanism has a number of turns along its length; as the number of turns is reduced, so the effect of the conveyor mechanism becomes less, and pure convection effects tend to take over. Using a screw conveyor, or a combination of screw and helix, these may be enhanced by having the column sloped as described. The same reference numerals are used as in FIG. 1 where appropriate.

Figure 2:
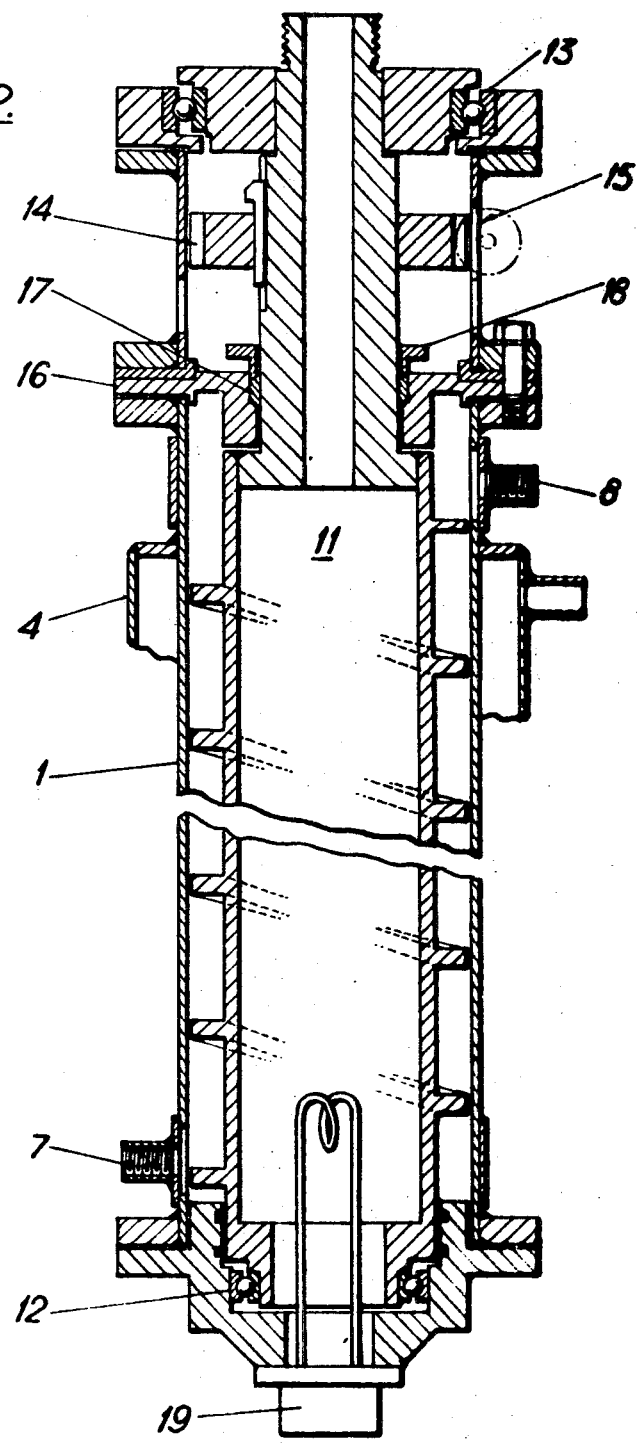
FIG. 2 shows a helical crystallizer in which the conveyor mechanism is a screw.

In FIG. 2 a screw conveyor 11 is mounted in the column 1 in bearings 12 and 13. A pinion 14 is keyed onto the shaft of the conveyor and adapted to be engaged by a suitable drive, not shown, through the side of the column 1 at 15; the portion of the column containing the pinion 14 is separated from the main body of the column by means of a gland housing 16, a packing 17 and a gland flange 18. The heater 5 of FIG. 1 is replaced by an immersion heater 19 inserted directly into the screw conveyor.

In FIG. 3, which is diagrammatic in nature, the column is again shown as 1, the upper part being surrounded by a cooler 4. The conveyor mechanism is in two parts, a screw conveyor 21 mounted in bearings 22 and 23, and driven through a pinion 24 by means not shown, and a helix 25, fixed to the top flight of the screw at 26. The helix itself rotates around a fixed central core 27, the core being sealed around the shaft of the screw by O-rings 28.

Figure 4:
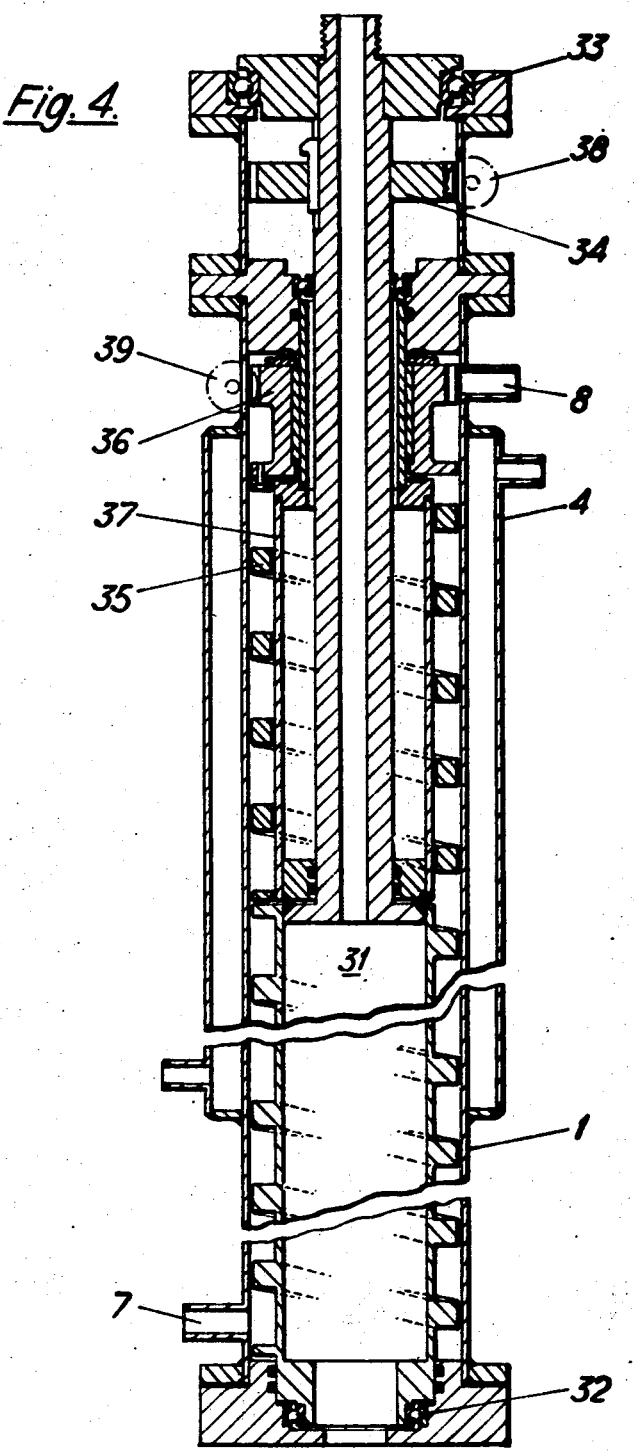
FIG. 4 shows a helical crystallizer in which the conveyor mechanism is made up partly of a screw, and partly of a helix, the two being mounted so that they can be driven at the same or different speeds.

In FIG. 4, which is again diagrammatic in nature, the column is shown as 1, the upper part being surrounded by a cooler 4. The conveyor mechanism is in two separate parts, a screw conveyor 31 mounted in bearings 32 and 33, and driven through a pinion 34 and a worm 38 and a helix 35 connected to and driven through a pinion 36 and a worm 39. The helix itself rotates around a fixed central core 37. In this construction, the screw and the helix may be driven at different speeds.

We claim:

1. Countercurrent crystallization apparatus for separating a crystallizable material from its solution, comprising a column inclined to the horizontal, a rotary conveyor mechanism of helical formation mounted within said column and having a close tolerance fit therewith, means for introducing feedstock into said column, devices for heating one end of said column and for cooling the other end of said column, and means for withdrawing one product from one end of said column and another product from the other end of said column, wherein the finish on the entire outer surface of said rotary conveyor mechanism is at least as good as A.A. 63 for effecting a high degree of separation of the crystallizable material from its solution.

2. Apparatus as claimed in claim 1 wherein said rotary conveyor mechanism is in the form of a central core within said column and a helix rotatably mounted about said central core.

3. Apparatus as claimed in claim 1 wherein said rotary conveyor mechanism is in the form of a screw conveyor which is rotatably mounted within said column.

4. Apparatus as claimed in claim 1 wherein said rotary conveyor mechanism is at least partly in the form of a screw conveyor which is rotatably mounted within said column.

5. Apparatus as claimed in claim 4, wherein said rotary conveyor mechanism is formed in part by a central core within part of said column and a helix rotatably mounted about said central core, and in part by a screw conveyor rotatably mounted in the rest of said column.

6. Apparatus as claimed in claim 5 wherein said central core and said helix are positioned in the cooling zone of said column, and said screw conveyor is positioned in the remainder of said column, the apparatus including means connecting said helix and said screw conveyor together whereby said conveyor mechanism is in effect continuous along the length of said column.

7. Apparatus as claimed in claim 5 wherein said central core and said helix are positioned in the cooling zone of said column and said screw conveyor is positioned in the rest of said column, said helix and said screw conveyor being unconnected whereby they may be driven at different speeds from each other.

8. Apparatus as claimed in claim 1 wherein said rotary conveyor mechanism is chromium plated.

9. Apparatus as claimed in claim 1 wherein said devices for heating and cooling said column comprise heating and cooling jackets conventionally mounted on the outside of said column and at opposite ends of said column, and further heating and cooling devices installed in the center of said rotary conveyor mechanism adjacent said heating and cooling jackets on the outside of said column.

10. Apparatus as claimed in claim 1 wherein said rotary conveyor mechanism has a helical hollow flight, and means are provided for circulating a heating or cooling medium through said hollow flight.